Dec. 5, 1967  A. R. SCHNASE  3,356,325
CAMERA-TO-TRIPOD CONNECTOR
Filed Oct. 22, 1965
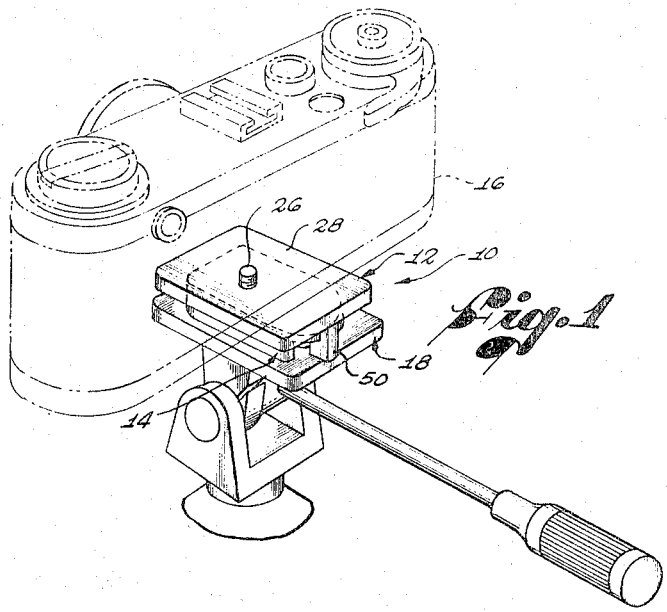
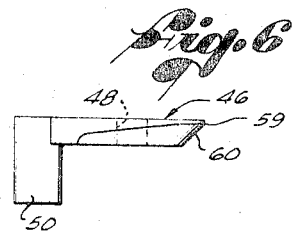
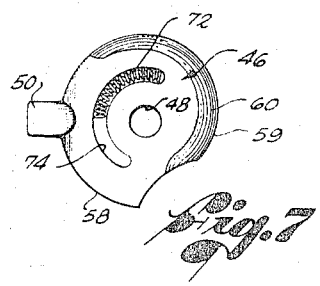
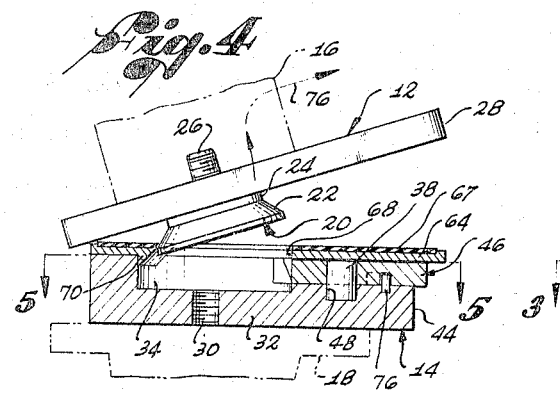
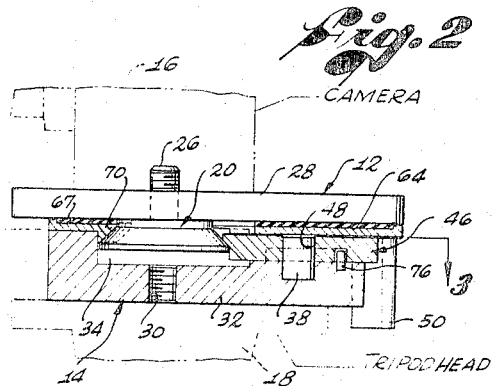
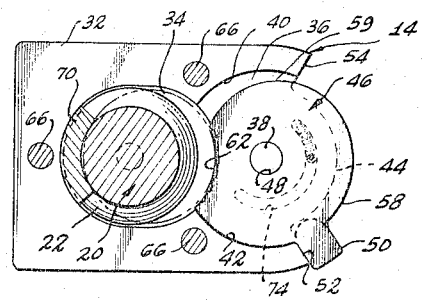
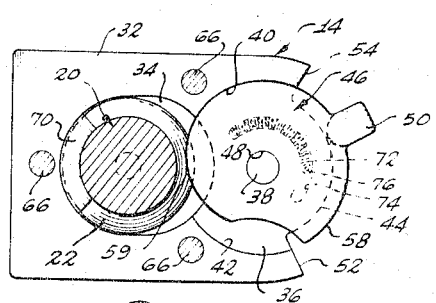
INVENTOR.
ADOLPH R. SCHNASE
BY Forrest J. Lilly
ATTORNEY

United States Patent Office 3,356,325
Patented Dec. 5, 1967

3,356,325
CAMERA-TO-TRIPOD CONNECTOR
Adolph Robert Schnase, Norco, Calif., assignor to Davidson Optronics, Inc., West Covina, Calif., a corporation of California
Filed Oct. 22, 1965, Ser. No. 501,355
7 Claims. (Cl. 248—187)

ABSTRACT OF THE DISCLOSURE

Describes a quick-disconnect mounting for a camera onto a tripod, the mounting having at the bottom a locking button receivable in a hole in a platform on the tripod, with a spring urged locking cam engageable with the locking button to cam-lock the camera to the tripod.

---

The present invention relates to improvements in camera-to-tripod connectors and, more particularly, to an improved connector for quickly attaching a camera to and rapidly releasing a camera from the head of a tripod or the like.

The bodies of most photographic cameras are provided with means for attaching the camera to a tripod. Generally, such means comprise a threaded socket in the bottom of the camera body for receiving a threaded stud which extends upwardly from the top of the tripod head. To attach the camera to the tripod, the stud is positioned in the threaded socket and the camera turned several times to screw the camera body onto the stud. To release the camera from the tripod, the foregoing operation is reversed.

The conventional attaching and releasing operation just described takes an appreciable amount of time and requires the photographer to exercise some care to ensure that the threads of the stud properly mate with the threads within the socket. Many times there is insufficient time to properly connect a camera to a tripod to take a particular picture. This requires the photographer to either hand-hold the camera or to miss the shot altogether.

In order to eliminate such occurrences and to speed up and simplify the attachment and release operations of a camera to a tripod, so-called "quick release" connectors have been developed. In general, they comprise an attachment member for connection to the bottom of a camera and a mounting base for connection to the head of the tripod. The mounting base is generally provided with a hand-operable clutch arrangement for releasably receiving and gripping the attachment member to connect the attachment member and hence the camera to the tripod. Although such connectors materially reduce the time required to attach a camera to a tripod and simplify the attachment and release operation, the clutch arrangements thereof are relatively complex in structure and operation. Accordingly, presently available quick release connectors are relatively expensive and in practice are fairly difficult and expensive to service. For these as well as other reasons, quick release connectors have found only limited use to date.

Accordingly, it is an object of the present invention to provide an improved connector for quickly attaching a camera to and rapidly releasing a camera from the head of a tripod.

Another object of the present invention is to provide a connector of the foregoing character which is simple in design and inexpensive to manufacture and service.

A further object of the present invention is to provide a connector of the foregoing character which is simple to operate and reliable in its operation.

Still another object of the present invention is to provide a quick release camera-to-tripod connector which is not subject to accidental release and will not allow the camera to be accidentally separated from the tripod.

The connection of the present invention comprises a camera mounting member with locking button engageable downwardly into a hole in a platform on the tripod. The button, in a preferred form, is generally frusto-conical in form. One edge of this button engages under a flange at one edge of the hole; and engageable over the other edge of this button is a rotary cam member with a spiral cam edge. This cam member moves progressively deeper under the button, and acts progressively to draw the button and camera mounting member down tightly onto the tripod platform into a locked position. A spring urges the cam to this locked position.

The foregoing as well as other objects and advantages of the present invention may be more clearly understood by reference to the following detailed description when considered with the accompanying drawing, which, by way of example only, illustrates one form of camera-to-tripod connector embodying the features of the present invention.

In the drawing:

FIG. 1 is a perspective view of the connector mounting a camera on top of a tripod, the camera being shown in phantom outline;

FIG. 2 is a sectional side view of the connector with the attachment member thereof releasably secured to the mounting base of the connector;

FIG. 3 is a sectional top view taken along the line 3—3 in FIG. 2;

FIG. 4 is a sectional side view similar to FIG. 2 illustrating the manner in which the attachment member is fitted into and removed from the mounting base of the connector;

FIG. 5 is a sectional top view taken along the line 5—5 of FIG. 4 before the attachment member is removed, the position of the attachment member just prior to exit from the mounting member being shown in phantom outline;

FIG. 6 is a side view of a cam member of the connector utilized to clamp the attachment member within the mounting base; and FIG. 7 is a bottom view of the cam member illustrated in FIG. 6.

In the drawing, the camera-to-tripod connector is represented generally by the numeral 10. Basically, the connector 10 comprises an attachment member 12 and a mounting base member 14. The attachment member 12 is adapted for connection to the base or the bottom of a camera body 16 while the mounting base member 14 is adapted for connection to the top of a tripod 18. Generally speaking, the mounting base 14 is adapted to receive the attachment member 12 in a manner whereby the attachment member and hence the camera 16 may be quickly attached to and released from the tripod 18 and wherein the camera may be directed in any desired direction on the top of the tripod and is not subject to accidental disconnection from the tripod.

More particularly, the attachment member 12 comprises a circular disc or short cylindrical button 20 having an outwardly and downwardly inclined outer surface 22. In the illustrated form, the button 20 is a frusto-conical button and the surface 22 is an inclined annular surface extending downwardly and outwardly from a generally cylindrical top section 24 of the button 20. The attachment member may be permanently fastened to the camera body 16. Alternatively, and as illustrated, the attachment member may be a separate attachment including an upwardly projecting stud 26 connected to and extending through a support plate 28 with a threaded head for screwing into the usual tripod screw socket formed in the bottom of the camera body.

The mounting base 14 may be a permanent part of the tripod head. Alternatively, and as illustrated, the mounting base member may be a separate attachment including a threaded bore 30 in its base housing 32 for releasably receiving the standard upwardly projecting threaded stud of a tripod.

In addition to the threaded bore 30, the base housing 32 includes a top hole 34 communicating with the bore 30. The hole 34 is generally elliptical and elongated in the front-to-rear direction of the base housing 32 to allow the button 20 to fit easily within the top hole and to slide forward and back therein. The back wall of the top hole 34 is cut away and communicates with a slotted rear portion 36 which opens to the rear of the housing. A stub shaft 38 extends vertically from the base of the rear portion 36 in line with the center of the top hole 34 and the side walls 40 and 42 of the rear portion 36 adjacent the top hole are arc shaped and concentric with the stub shaft 38. In addition, the floor of the base housing 32 at the rearmost end is cut away to define an arcuate rear wall 44 also concentric with the stub shaft 38.

The stub shaft 38 is adapted to mount a generally flat, disc-shaped cam member 46 having a central opening 48 for receiving the stub shaft. Thus supported, the cam member 46 is adapted to turn about the stub shaft 38. To aid the photographer in turning the cam member 46, a handle 50 extends outwardly and downwardly from the cam member and travels therewith along the arcuate rear wall 44 of the base housing 32 between stop positions defined by shoulders 52 and 54 at opposite ends of the arcuate rear wall.

As illustrated most clearly in FIGS. 3, 5 and 7, the outer edge 58 of the cam member 46 is generally spiral shaped relative to the central opening 48 with the portion 59 of the edge generally opposite the handle 50 being closest the central opening and increasing in radial dimension in a clockwise direction toward the handle 50 (when viewed from the top). In addition, the circumferential surface 60 (see FIGS. 6 and 7) below the edge portion 59 is downwardly and inwardly inclined and adapted to mate with and exert a camming action against the inclined surface 22 of the button 20 upon a turning of the cam member 46 about the stub shaft 38. In this regard, when the handle 50 is against the stop 52 (see FIG. 5), the cam member 46 is removed from the top hole 34, a portion 62 of the cam member being recessed to follow the curvature of the top hole at its rear wall. However, as the cam member 46 is turned in a counterclockwise direction (when viewed from the top), the edge portion 59 travels into the rear portion of the top hole 34. As will be described hereinafter, as this occurs, the inclined surface 60 engages and presses tightly against the inclined surface 22 of the button 20 to cam the button both towards the flange 70, and downwardly as well, so as to lock the button within the top hole 34 and hence the camera 16 to the top of the tripod 18.

The cam member 46 is held in place within the rear portion 36 of the base housing 32 by a top cover plate 64. The cover plate extends completely over the top of the base housing 32 and is secured thereto by a plurality of screws 66. The cover plate thus captures the cam member 46 within the rear portion of the base housing and around the stub shaft 38 to prevent the cam from being accidentally removed from the mounting base 14 while allowing the cam member to turn freely within the mounting base into and out of the top hole 34.

The central portion of the cover plate 64 is slightly recessed to receive a protective layer 67 of rubber or plastic material which acts as a support cushion for the bottom of the plate 28 of the attachment member 12. In addition to the recessed central portion, the cover plate 64 includes a hole 68 conforming generally to the top hole 34 in the base housing 32. In fact, the rear portion of the hole 68 exactly follows the contour of the rear portion of the top hole 34. At the front of the opening 68, however, is the inwardly projecting top of a flange 70. The flange 70 extends downwardly from the cover plate 64 and includes an arcuate, inwardly and upwardly inclined surface for engaging and mating with the inclined surface 22 of the button 20. Thus arranged, the flange 70 acts as a stop member for over-lying the front portion of the button 20 to prevent the button 20 from being removed from the top hole 34 when the cam member 46 is pressing against the rear portion of the button.

In operation, the cam member 46 is normally maintained in a position wherein the handle 50 is approximately midway between the shoulders 52 and 54. This means that the inclined surface 60 below the edge portion 59 normally lies within the rear portion of the top hole 34. Such positioning of the cam member 46 is provided by a coil spring 72 stationed within an arcuate slot 74 in the bottom of the cam member. One end of the coil spring 72 presses against an end of the arcuate slot 74 and the other end presses against a pin 76 extending upwardly from the bottom of the base housing 32 to ride within the slot upon a turning of the cam member 46. The pin 76 is located directly to the rear of the stub shaft 38 and the coil spring 72 in pressing thereagainst produces a counterclockwise turning of the cam member 46 to normally urge the inclined surface 60 into the rear portion of the top hole 34. When the button 20 is in the top hole, this means that the inclined surface 60 normally extends over the back portion of button 20 to capture the button within the top hole and prevent the accidental disconnection of the attachment member from the mounting base member and hence an accidental separation of the camera from the tripod.

Because of the initial positioning of the cam member 46 in the rear of the top hole 34, before the button 20 can be inserted into the top hole, and the camera 16 connected to the tripod 18, the cam member must be turned to the position illustrated in FIG. 5 with the recessed portion 62 exposed to the back of the top hole. The camera 16 is then tilted forward to angle the button 20 down into the top hole 34 with the inclined front portion of the button fitting under the flange 70 and the support plate 28 resting on top of the cover plate 64. The cam member 46 is then released and under the action of the spring 72 turns in a counterclockwise direction to its normal position. In so doing, the inclined surface 60 enters the back portion of the top hole 34 to extend over the top of the inclined back portion of the button 20. A further manual turning of the cam member 46 in the counterclockwise direction brings the inclined surface 60 tightly into engagement with the inclined surface 22 of the button 20. Due to the spiral shape of the inclined surface 60, a further turning of the cam member 46 tightens the cam member firmly against the button 20, forcing the button tightly against the flange 70 to securely lock the button in place within the top hole 34 and, in turn, the camera 16 to the head of the tripod 18.

After the camera 16 is once secured to the tripod 18, if the handle 50 is accidentally bumped to unlock the cam member 46 from the button, the cam member simply returns to its normal position. As previously indicated, the inclined surface 60 is still over the top of the rear portion of the button 20 and holds the button within the top hole and prevents the camera 16 from being accidentally knocked from the tripod 18.

To release the camera 16 from the tripod 18, the previously described locking operation is simply reversed. In particular, the cam member 46 is manually turned to the position illustrated in FIG. 5 to completely open the back of the top hole 34. The camera and button 20 are then moved toward the rear of the top hole, tilted forward and raised in the direction indicated by the arrows 76 in FIG. 4.

In this manner, the camera-to-tripod connector 10 allows the camera 16 to be rapidly attached to and quickly released from the tripod 18 with a minimum of effort and with assurance that the camera will not be accidentally dislodged from the tripod as the tripod is moved from one location to another or during turning operation of the tripod head. Furthermore, the connector of the present invention accomplishes the foregoing with an extremely simple design which is inexpensive to manufacture, easy to operate and reliable in its operation.

While a particular form of connector has been described in some detail herein, changes and modifications may occur to those skilled in the art without departing from the spirit of the present invention. It is, therefore, intended that the present invention be limited in scope only by the terms of the following claims.

What is claimed is:

1. A camera-to-tripod connector, comprising:
an attachment member for engagement with a mounting base member connected to a tripod and for connection to the bottom of a camera and including a downwardly projecting mounting button having an undercut outwardly extending front portion and a curved rear portion with a downwardly and outwardly inclined peripheral surface;
a mounting base member for connection to the top of a tripod and including a top engaged by said mounting base member and a top hole for receiving said button, a stop member extending inwardly over a front portion of said hole, and a cam member supported for turning about a generally vertical axis to the rear of said hole and including an upwardly and outwardly inclined peripheral camming edge portion of increasing radial dimension relative to said vertical axes for turning with said cam into said hole to engage said rear portion of said button and to thereby cam said button toward said stop member, and downwardly relative to said cam, to releasably lock said button within said hole against said stop member and said cam; and
spring means for continuously urging said cam member to turn said edge portion into said hole to prevent accidental disconnection of said camera from said tripod.

2. The connector of claim 1 wherein said button is frusto-conical in form and wherein said stop member is an arcuate flange having a downwardly and forwardly inclined lower surface for engaging the front portion of said button within said top hole.

3. The connector of claim 1 wherein said attachment member includes a threaded stud extending upwardly from said button for screwing into a threaded socket in said camera.

4. The connector of claim 3 wherein said attachment member includes a camera support plate and wherein said stud extends from a top of said plate and said button from a bottom of said plate.

5. The connector of claim 1 including handle means extending from said cam member.

6. The connector of claim 1 wherein said cam member includes an arcuate recess and wherein said spring means includes a coil spring lying within said recess with opposite ends pressing against the end of said recess and said base member.

7. A mounting base member for a camera-to-tripod connector, comprising:
a base housing for connection to a tripod and including a top hole for receiving a button member having an outwardly extending front portion and a curved rear portion with a downwardly and outwardly inclined surface, said projection member being connected to a camera;
a stop member extending over a front portion of said hole;
a cam member supported on said base housing for turning about a generally vertical axis to the rear of said hole and including an upwardly and outwardly inclined edge portion of increasing radial dimension relative to said vertical axes for turning with said cam into said hole to engage said rear portion of said button and to thereby releasably lock said button within said hole against said stop member; and
spring means for continuously urging said cam member to turn said edge portion into said hole.

References Cited

UNITED STATES PATENTS

| | | | |
|---|---|---|---|
| 1,422,513 | 7/1922 | Applas | 24—211 |
| 2,536,170 | 1/1951 | Guest | 248—177 |
| 3,184,196 | 5/1965 | Dent | 248—187 |

ROY D. FRAZIER, *Primary Examiner.*

J. F. FOSS, *Assistant Examiner.*